(12) United States Patent
Fang et al.

(10) Patent No.: US 11,602,720 B2
(45) Date of Patent: Mar. 14, 2023

(54) DRY GRANULATOR

(71) Applicant: ZHEJIANG CANAAN TECHNOLOGY LIMITED, Wenzhou (CN)

(72) Inventors: Zheng Fang, Wenzhou (CN); Ce Fang, Wenzhou (CN); Jian Sun, Wenzhou (CN); Meng Pu, Wenzhou (CN); Yueyong Liu, Wenzhou (CN)

(73) Assignee: ZHEJIANG CANAAN TECHNOLOGY LIMITED, Wenzhou (CN)

( * ) Notice: Subject to any disclaimer, the term of this patent is extended or adjusted under 35 U.S.C. 154(b) by 313 days.

(21) Appl. No.: 16/981,705

(22) PCT Filed: Jan. 11, 2020

(86) PCT No.: PCT/CN2020/071568
§ 371 (c)(1),
(2) Date: Sep. 17, 2020

(87) PCT Pub. No.: WO2020/199719
PCT Pub. Date: Oct. 8, 2020

(65) Prior Publication Data
US 2021/0245126 A1  Aug. 12, 2021

(30) Foreign Application Priority Data
Mar. 29, 2019 (CN) .......................... 201910248795.0

(51) Int. Cl.
*B01J 2/22* (2006.01)
*B30B 11/28* (2006.01)
*B30B 15/30* (2006.01)

(52) U.S. Cl.
CPC ................. *B01J 2/22* (2013.01); *B30B 11/28* (2013.01); *B30B 15/308* (2013.01)

(58) Field of Classification Search
CPC .. B30B 3/00; B30B 3/02; B30B 15/30; B30B 15/302; B30B 15/308; B30B 11/003;
(Continued)

(56) References Cited

U.S. PATENT DOCUMENTS 6,264,360 B1 * 7/2001 Lehmusvaara ..... B01F 35/4111
403/DIG. 4
6,513,424 B1 * 2/2003 Iwasaki ............... B30B 15/0017
100/168
(Continued)

FOREIGN PATENT DOCUMENTS

CN 2920378 Y 7/2007
CN 202036966 U 11/2011
(Continued)

OTHER PUBLICATIONS

Translation of the description section of CN107670584, Jul. 11, 2007 (Year: 2007).*

*Primary Examiner* — Matthew Katcoff
(74) *Attorney, Agent, or Firm* — Bayramoglu Law Offices LLC

(57) ABSTRACT

A dry granulator includes a rack, a feeding device mounted on the rack, and a slip roller device. The feeding device includes a vertical feeding screw, a buffer hopper, a stirring paddle, a horizontal feeding screw, and two drive assemblies. The drive assembly includes a drive motor and a drive shaft. The slip roller device includes a servo motor, a trapezoidal screw, a primary slip roller assembly and a secondary slip roller. The primary slip roller assembly includes a support frame, and a primary slip roller. A guide rail is arranged between the servo motor and the secondary slip roller. The support frame is provided with a screw hole. A coupling member is arranged between the output shaft of the drive motor and the drive shaft. The coupling member includes a reserved space. The horizontal feeding screw and (Continued)

the vertical feeding screw are drivingly provided with a transmission member, respectively.

7 Claims, 7 Drawing Sheets

(58) Field of Classification Search
CPC ....... B30B 11/006; B30B 11/16; B30B 11/28;
B30B 11/24; B30B 11/241; B30B 11/245;
B30B 9/12; B30B 9/124; B30B 9/127;
B30B 9/128; B30B 9/14; B30B 9/16;
B30B 9/163; B01J 2/22; B65G 33/14;
B65G 65/22; B65G 33/32; B65G 53/48;
B65G 2812/05; B65G 2812/0505; B65G
2812/0511; B65G 2814/0264; F16D 1/10;
F16D 1/104; F16D 1/108; F16D 1/116
See application file for complete search history.

(56) References Cited

U.S. PATENT DOCUMENTS

| 7,384,256 | B1 * | 6/2008 | Clark | B30B 11/18 |
| | | | | 425/363 |
| 9,108,345 | B2 * | 8/2015 | Pfeiffer | B29C 48/53 |
| 9,255,591 | B2 * | 2/2016 | Carnevali | F16B 1/00 |
| 10,480,587 | B2 * | 11/2019 | Knuth | F16D 11/14 |

FOREIGN PATENT DOCUMENTS

| CN | 102631866 A | 8/2012 |
| CN | 205435670 U | 8/2016 |
| CN | 107670584 A | 2/2018 |
| CN | 207446177 U | 6/2018 |
| CN | 109985568 A | 7/2019 |
| CN | 209530787 U | 10/2019 |
| CN | 209871493 U | 12/2019 |
| CN | 209871791 U | 12/2019 |
| JP | H11169701 A | 6/1999 |

* cited by examiner

DRY GRANULATOR

CROSS REFERENCE TO THE RELATED APPLICATIONS

This application is the national phase entry of International Application No. PCT/CN2020/071568, filed on Jan. 11, 2020, which is based upon and claims priority to Chinese Patent Application No. 201910248795.0, filed on Mar. 29, 2019, the entire contents of which are incorporated herein by reference.

TECHNICAL FIELD

The present invention relates to a dry granulator.

BACKGROUND

A dry granulator is an article of equipment for making materials into particles, and is commonly used in the pharmaceutical field. A dry granulator typically includes a rack, a feeding device mounted on the rack, and a slip roller device. The feeding device includes a vertical feeding screw, a buffer hopper, a stirring paddle arranged in the buffer hopper, a horizontal feeding screw, and a drive assembly for driving the vertical feeding screw and the horizontal feeding screw. The drive assembly includes two drive shafts and a drive motor. The two drive shafts are drivingly connected to the horizontal feeding screw and the vertical feeding screw respectively, and the drive motor is drivingly connected to the drive shafts. The slip roller device includes a primary slip roller, a secondary slip roller, and an adjusting assembly for adjusting a gap between the primary slip roller and the secondary slip roller. In operation, material enters the buffer hopper through the feed port, and then is transported to the slip roller group through the horizontal feeding device and subsequently through the vertical feeding device. The material is compressed into a sheet by the slip roller group, and then is milled, granulated, and sieved to form the finished product. In general, each time after the dry granulator completes granulation, the vertical feeding screw, the buffer hopper, the stirring paddle arranged in the buffer hopper, and the horizontal feeding screw need to be disassembled and cleaned to avoid cross contamination between different materials. Before the dry granulator is operated, it is necessary to adjust a gap between the primary slip roller and the secondary slip roller according to different material properties to ensure that the thickness of the compressed material meets requirements, so as to provide good characteristics of rolled sheets for the next step of granulating in the granulation machine.

In the prior art, a gap between the primary slip roller and the secondary slip roller is usually adjusted by adjusting the primary slip roller close to or away from the secondary slip roller by a hydraulic system connected to the primary slip roller. Because of the difference in particle size and particle strength between different materials, a gap between the primary slip roller and the secondary slip roller needs to be precisely calculated and adjusted to achieve the required thickness of the resultant compressed material. Furthermore, in the process of removing the vertical feeding screw, the buffer hopper, the stirring paddle arranged in the buffer hopper and the horizontal feeding screw, it is necessary to gradually disassemble the frame part which covers and supports the feeding assembly, and to separate the vertical feeding screw and the buffer hopper from the corresponding drive assembly. A change of material type requires the disassembly of the dry granulator which is complicated and tedious, and which adversely affects the efficiency of production.

SUMMARY

In view of the disadvantage of the prior art, the present invention provides a dry granulator, which simplifies the process of disassembly and operation, and is convenient for cleaning, maintenance, and adjustment when the material is changed.

In order to achieve the above objective, the dry granulator includes a rack, a feeding device mounted on the rack, and a slip roller device. The feeding device includes a vertical feeding screw, a buffer hopper, a stirring paddle arranged in the buffer hopper, a horizontal feeding screw, and two drive assemblies, wherein the two drive assemblies drive the vertical feeding screw and the horizontal feeding screw to operate, respectively. The drive assembly includes a drive motor, and a drive shaft drivingly connected to an output shaft of the drive motor. The slip roller device includes a servo motor, a trapezoidal screw drivingly connected to the servo motor, a primary slip roller assembly and a secondary slip roller. The primary slip roller assembly includes a support frame, and a primary slip roller mounted on the support frame. A guide rail is arranged between the servo motor and the secondary slip roller, and the support frame is adapted to slide back and forth on the guide rail between the servo motor and the secondary slip roller. The support frame is provided with a screw hole drivingly cooperating with the trapezoidal screw. A coupling member is arranged between the output shaft of the drive motor and the drive shaft to drivingly connect the output shaft of the drive motor and the drive shaft. The coupling member includes a reserved space in which the drive shaft can slide toward the coupling member. Each of the horizontal feeding screw and the vertical feeding screw is provided with a transmission member, and the transmission member is drivingly and pluggably axially connected to each of the two drive shafts corresponding to the horizontal feeding screw and the vertical feeding screw, respectively. A locking assembly is arranged at the connection between the transmission member and the drive shaft, and the locking assembly is configured to axially position the transmission member and the drive shaft when the transmission member is drivingly and pluggably axially coupled to the drive shaft.

The advantages of adopting the above technical solution are as follows. When operating the servo motor, due to the transmission connection between the screw hole arranged on the support frame and the output screw of the servo motor, and the guiding function of the guide rail, the primary slip roller installed on the support frame slides back and forth between the servo motor and the secondary slip roller assembly, so as to adjust the gap between the primary slip roller and the secondary slip roller assembly. By a corresponding relationship between the rotation angle of the servo motor and the sliding distance, the gap between the left and right slip rollers can be accurately adjusted, without precise calculation steps. When it is necessary to separate the drive assembly from the feeding device, the locking assembly at the connection between two transmission members and the drive shafts respectively corresponding to the two transmission members is first opened to unlock the axial positioning between the transmission member and the drive shaft, and then the drive shaft is pushed toward the reserved space to separate the two transmission members from the corresponding drive shafts, respectively. As a result, the separation of the feeding device and the drive assembly is completed. The present invention simplifies the process of disassembly and operation of the dry granulator, and facilitates the adjustment needed for cleaning, maintenance and replacement of materials.

Further, the locking assembly includes a sleeve assembly. The sleeve assembly is formed by splicing a first splicing sleeve forming an axial limit and fit with the drive shaft and a second splicing sleeve sleeved on the outside of the transmission member. The first splicing sleeve passes through the rack and slides on the rack, and the first splicing sleeve and the second splicing sleeve are detachably connected to each other.

Based on the above arrangement, the sleeve assembly axially positions the transmission member and the drive shaft. When the sleeve needs to be removed, the first splicing sleeve is pushed toward the coupling member, and due to the axial limit and fit between the first splicing sleeve and the drive shaft, the drive shaft is driven by the first splicing sleeve to slide toward the reserved space in the installation hole, thereby separating the transmission member which is plugged into the drive shaft from the drive shaft. In this way, the process of disassembly and assembly is further simplified, and is convenient for the cleaning and maintenance of the dry granulator.

Further, the feeding device includes a gearbox. The gearbox is provided with two driven shafts and a gear unit drivingly connecting the two driven shafts, wherein the two driven shafts are connected to the horizontal feeding screw and the stirring paddle, respectively. Two first bushings are arranged between the gearbox and the buffer hopper, and the driven shafts pass through the two first bushings. A second bushing is arranged between the horizontal feeding screw and the vertical feeding screw and forms a feeding channel between the horizontal feeding screw and the vertical feeding screw. Each of the first bushings and the second bushing is comprised of two separable half-pipe bodies.

Based on the above arrangement, the first bushing and the second bushing respectively cover and protect the driven shafts and the material to be transported. Since each of the first bushing and the second bushing are comprised of two separable half-pipe bodies, the gearbox, the buffer hopper and the vertical feeding device can be separated after disassembling the corresponding two half-pipe bodies and separating the two driven shafts from the feeding screw and the stirring paddle, respectively, which further simplifies the disassembly process and facilitates the cleaning and maintenance of the dry granulator.

Further, the first splicing sleeve and the corresponding second splicing sleeve are detachably connected to each other by a clamp, and the two half-pipe bodies of each of the first bushings and the second bushing are detachably connected to each other by a clamp. The first splicing sleeve and the corresponding second splicing sleeve are provided with two ring clamping blocks, respectively. The two half-pipe bodies of each of the first bushings and the second bushing are provided with two ring clamping blocks, respectively. The clamp can be simultaneously sleeved on the outsides of the two ring clamping blocks of the first splicing sleeve and the second splicing sleeve to axially position the first splicing sleeve and the second splicing sleeve; the clamp can be simultaneously sleeved on the outsides of the two ring clamping blocks of the two half-pipe bodies of each of the first bushings and the second bushing to axially position the two half-pipe bodies of each of the first bushings and the second bushing.

Based on the above arrangement, when the clamp is loosened, the axial positioning between the first splicing sleeve and the corresponding second splicing sleeve, and the axial positioning between the two half-pipe bodies of each of the first bushings and the second bushing is unlocked, which is convenient for operation and further simplifies the disassembly and assembly process.

Further, the buffer hopper and the gearbox are laterally arranged on one side of the rack, and a clamping base is arranged on the upper side of the rack. The upper end of the clamping base is provided with a slide groove extending along the arrangement direction of the buffer hopper and the gearbox. An L-shaped hanging plate is arranged on the buffer hopper and the gearbox, respectively, and the hanging plate can be hung in the slide groove and can slide along the slide groove.

Based on the above arrangement, when the buffer hopper and the gearbox are removed, the buffer hopper and the gearbox are disassembled from the connection of the vertical feeding assembly and the drive assembly respectively. In the process of disassembly, the gearbox and the buffer hopper without the support provided by the connection portion of the vertical feeding assembly and the drive assembly can still be attached to the rack through the two hanging plates respectively arranged on the buffer hopper and the gearbox. Then, when the buffer hopper is separated from the gearbox, the hanging plate arranged on the gearbox provides support to the gearbox. After separation, the hanging plates slide in the slide groove arranged on the rack to drive the buffer hopper and the gearbox to slide along the direction away from the vertical feeding assembly, so as to separate the parts for transmission among the buffer hopper, the gearbox and the vertical feeding assembly. Finally, the buffer hopper, the stirring paddle arranged in the buffer hopper, and the feeding screw are separated and removed from the gearbox, which simplifies the whole disassembly process and facilitates the cleaning and maintenance of the dry granulator.

Further, the rack is provided with a through hole to facilitate installation of the first splicing sleeve. A flange plate is arranged between the through hole and the first splicing sleeve to prevent the first splicing sleeve from extending axially to the outside of the rack. An end of the first splicing sleeve that is inserted on the inside of the rack is provided with a fixing block, and the first splicing sleeve is provided with an operating handle, wherein the operating handle is inserted from the outside of the rack to the inside of the rack and connected to the fixing block.

Based on the above arrangement, the operating handle can be pushed and pulled to cause axial movement of the first splicing sleeve. Since the operating handle is installed on the first splicing sleeve through the fixing block, when the operating handle is pushed and pulled, interference from the rack or other parts can be avoided, which further simplifies the disassembly process.

DETAILED DESCRIPTION OF THE EMBODIMENTS

Figure 1:
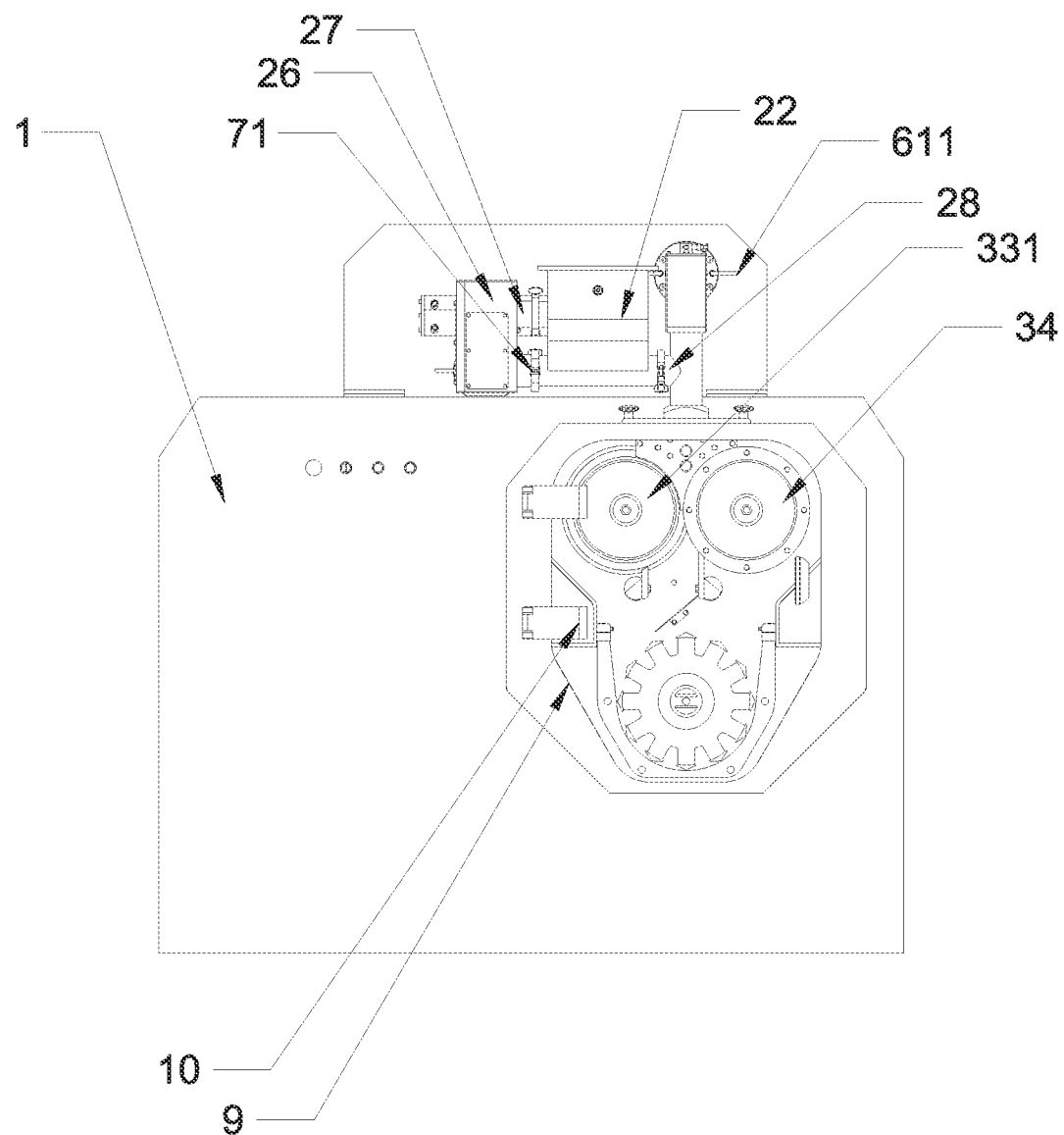
FIG. 1 is a general assembly diagram of an embodiment of the present invention.
Figure 2:
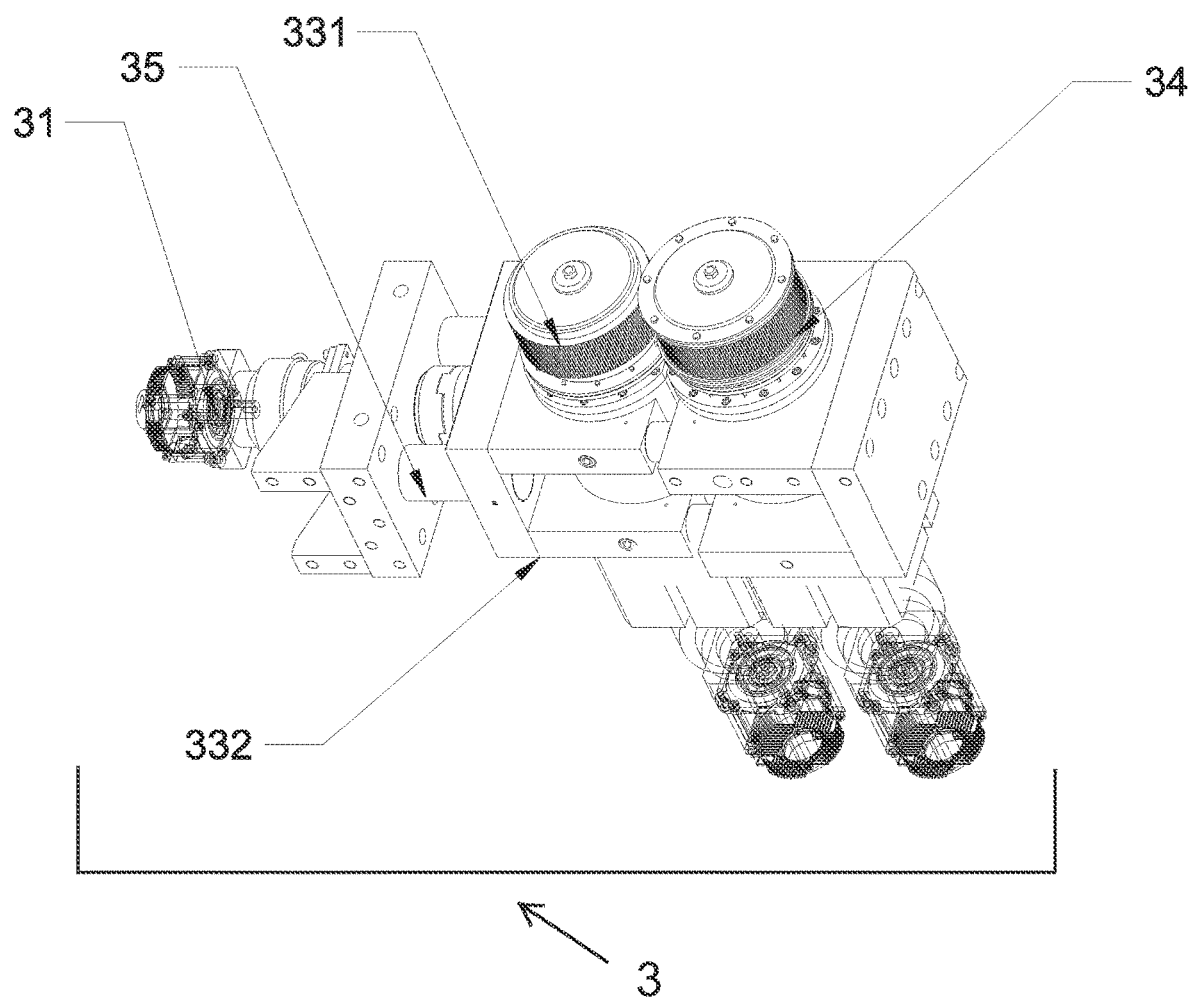
FIG. 2 is a first schematic diagram showing a portion of the structure of the embodiment of the present invention.
Figure 3:
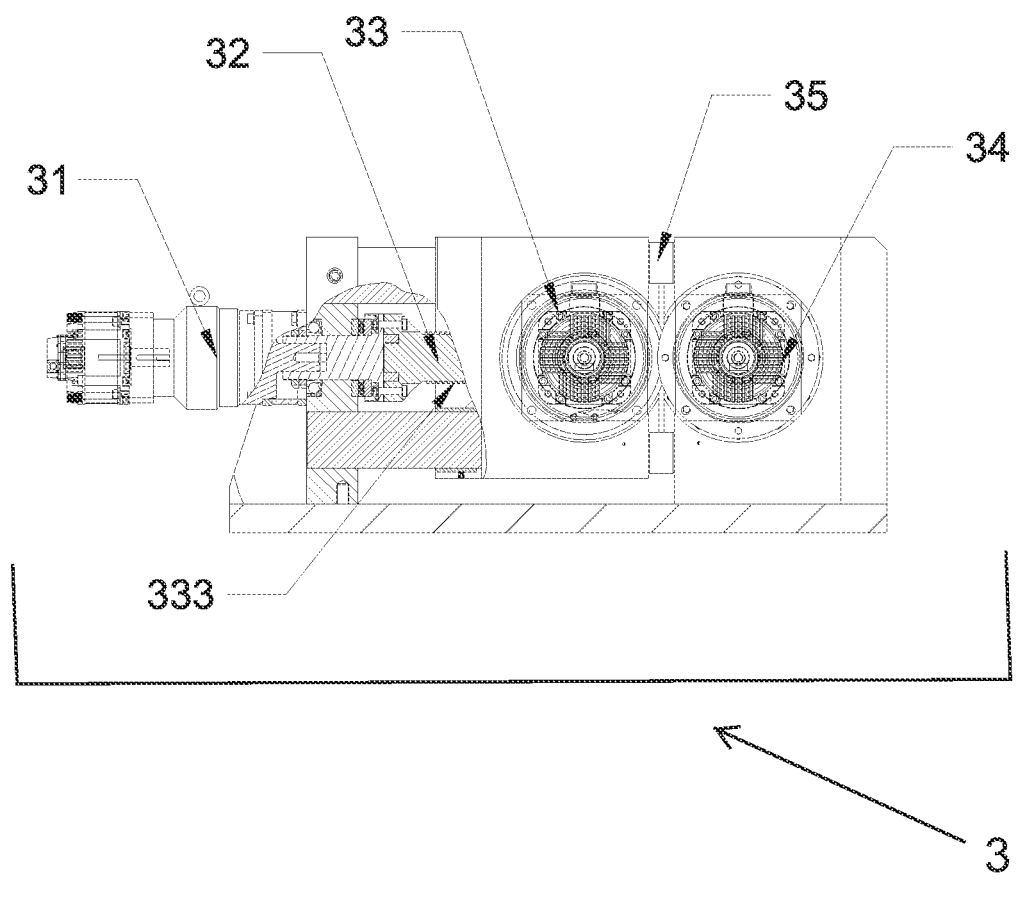
FIG. 3 is a second schematic diagram showing a portion of the structure of the embodiment of the present invention.
Figure 4:
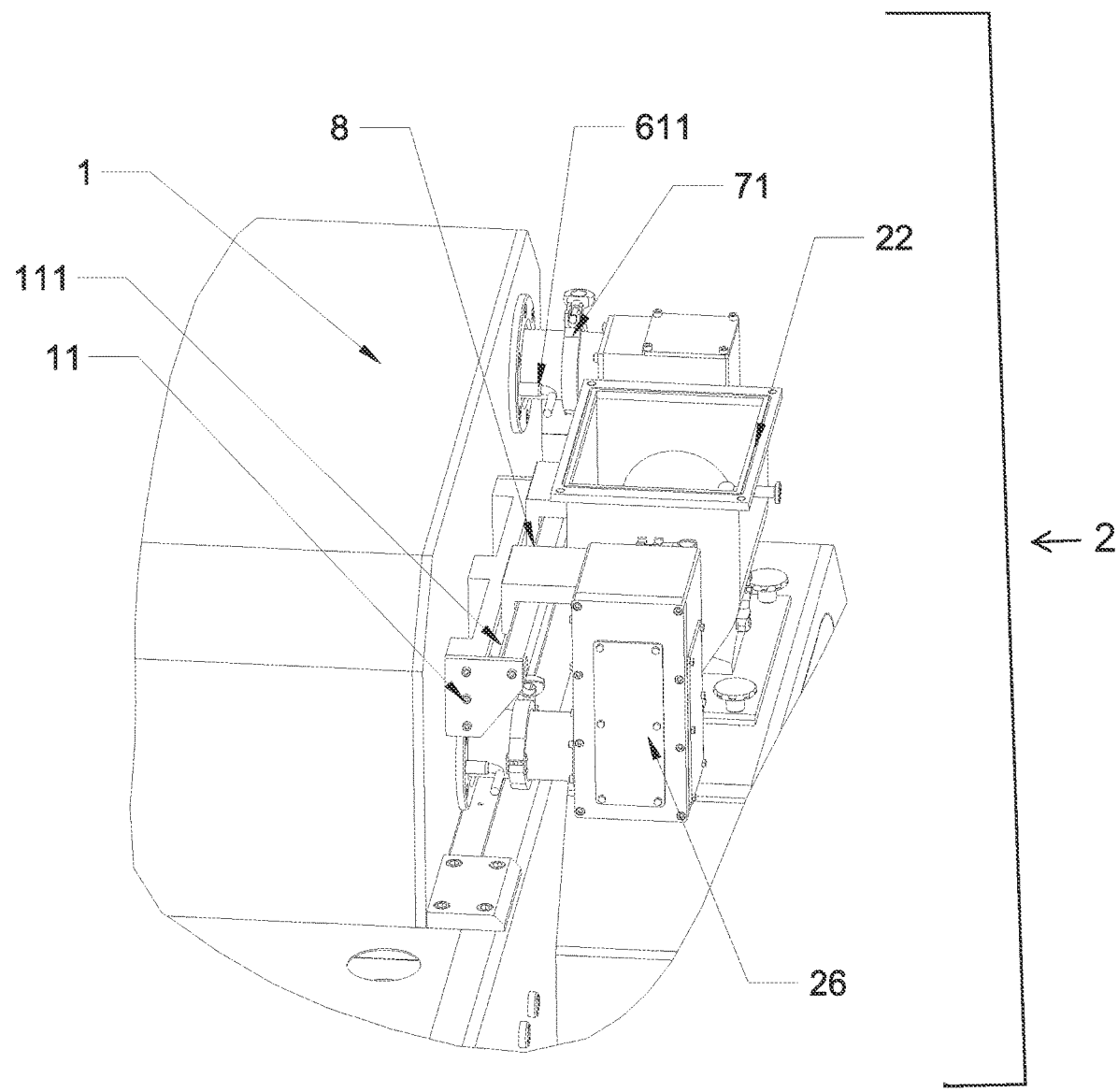
FIG. 4 is an enlarged view of a portion of the structure of the embodiment of the present invention.
Figure 5:
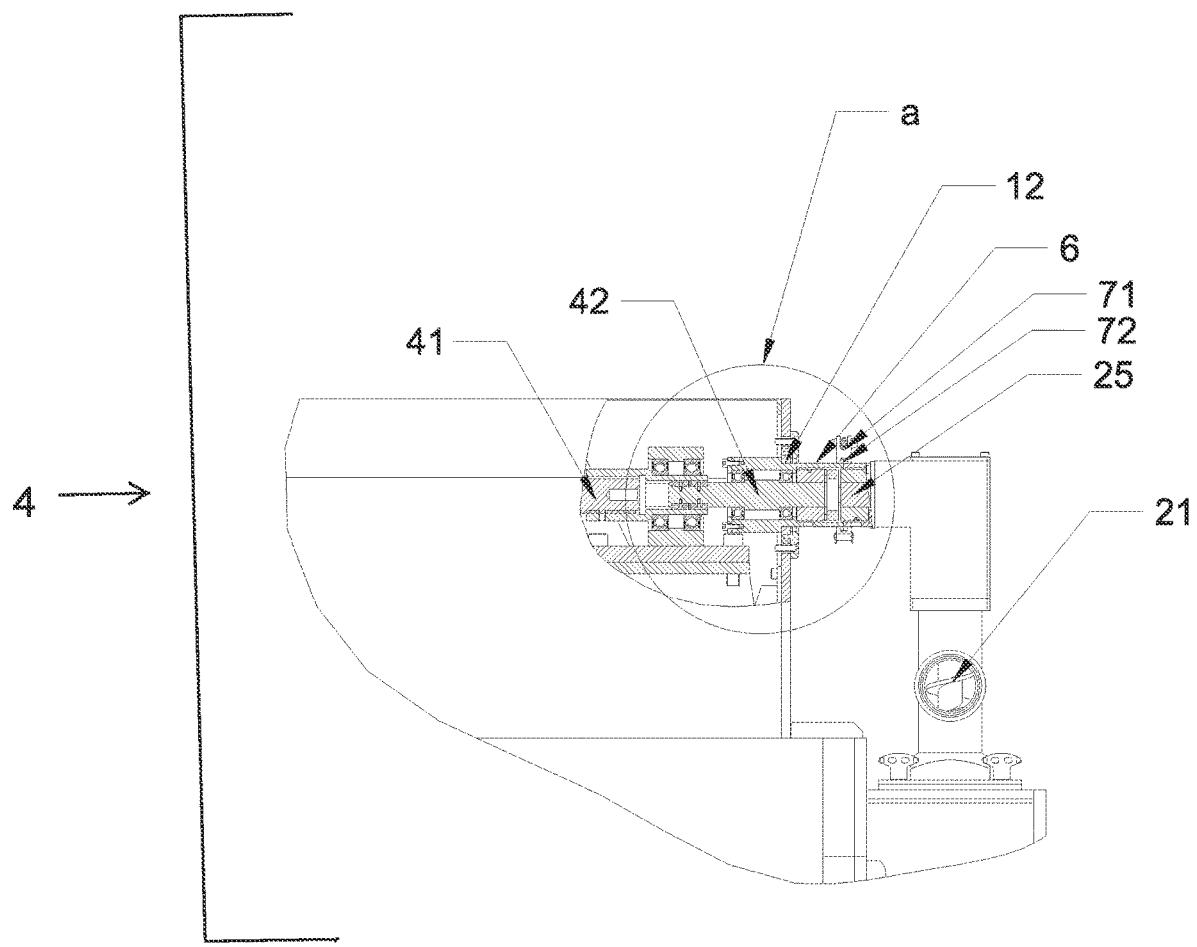
FIG. 5 is a schematic diagram showing a portion of the structure of the embodiment of the present invention.
Figure 6:
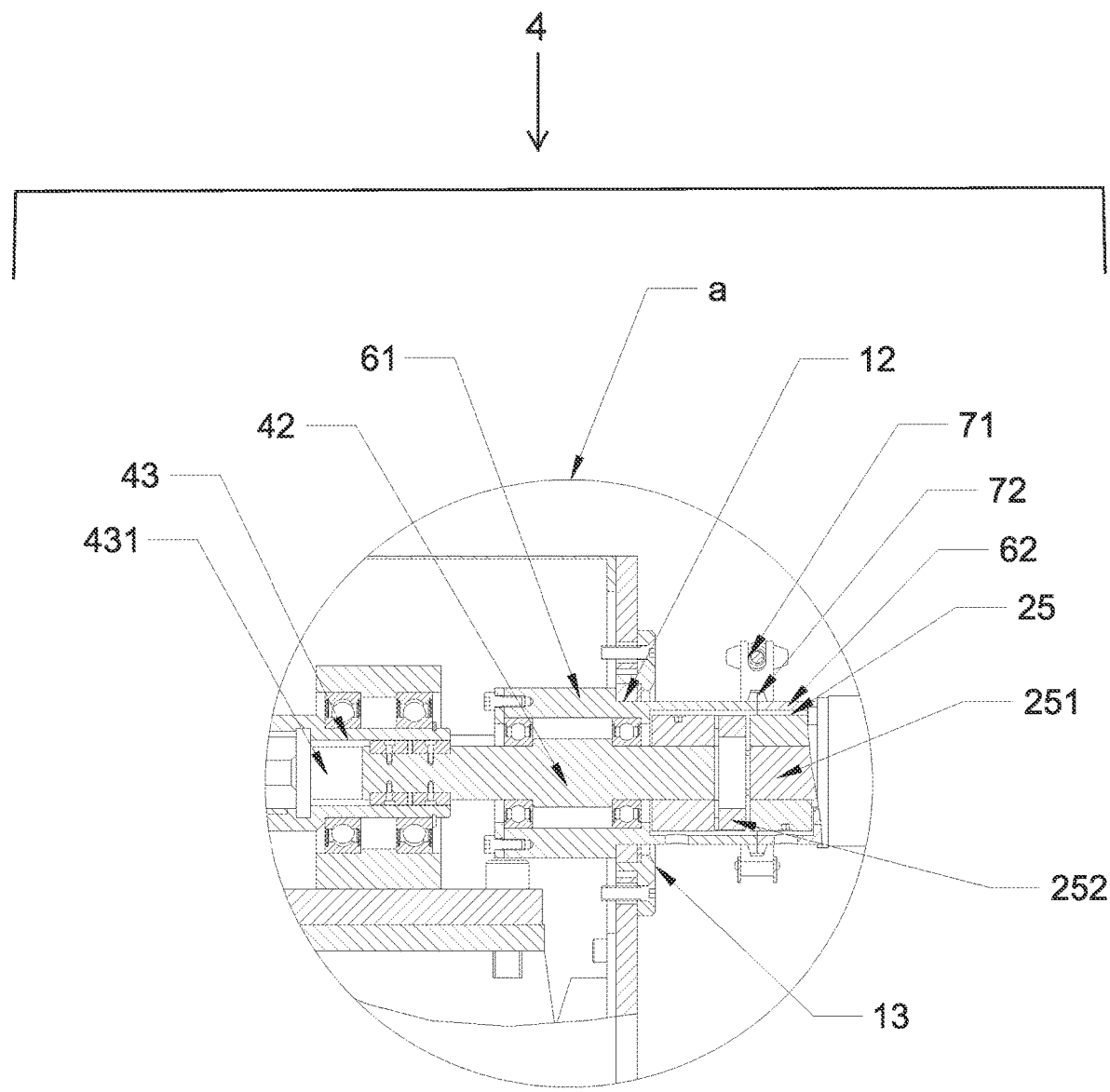
FIG. 6 is an enlarged view showing the portion (a) in FIG. 5 of the embodiment of the present invention.
Figure 7:
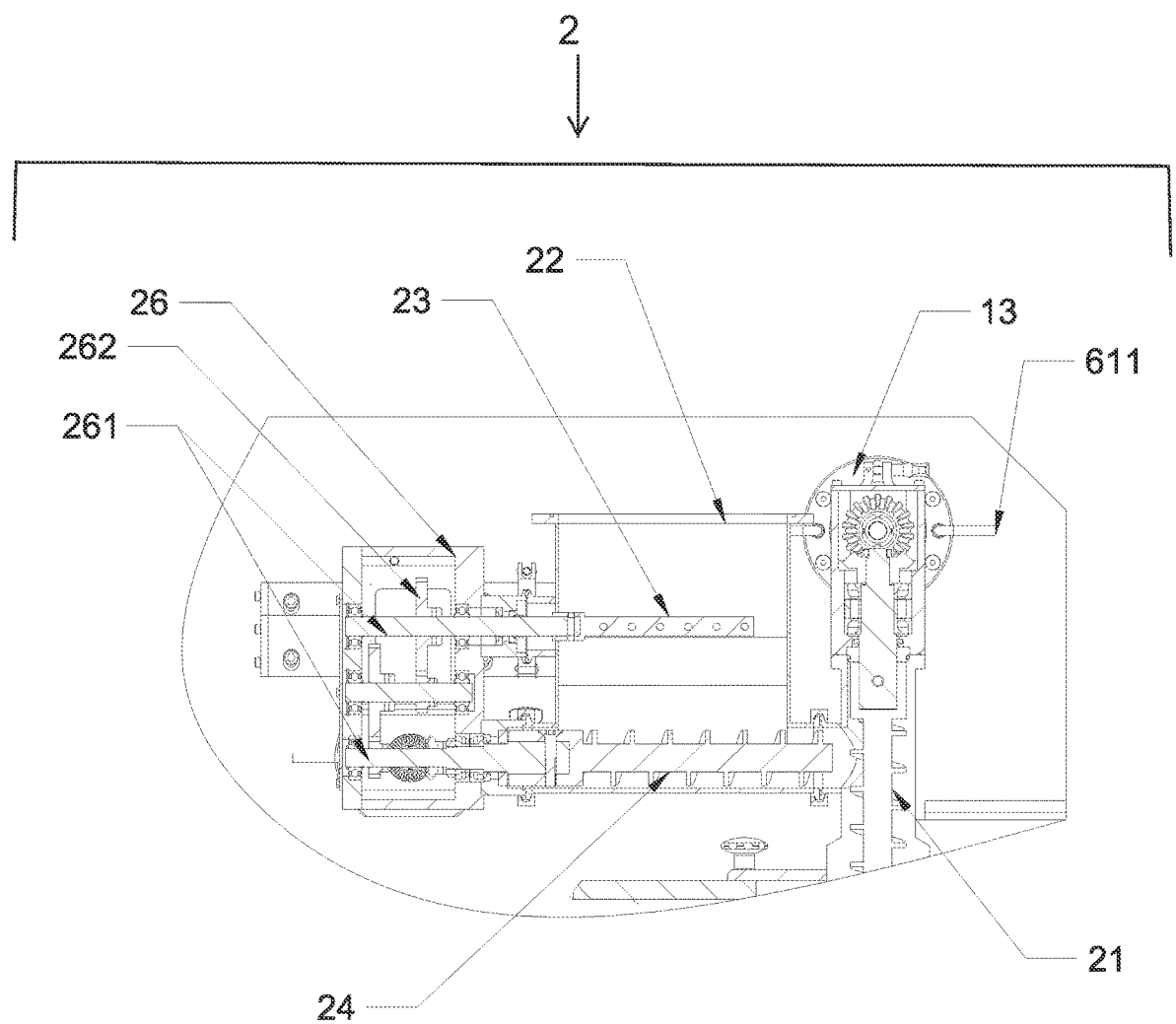
FIG. 7 is a schematic diagram showing a portion of the structure of the embodiment of the present invention.

A dry granulator of an embodiment of the present invention is shown in FIGS. 1-7, including the rack 1, the feeding device 2 mounted on the rack 1, and the slip roller device 3. The feeding device 2 includes the vertical feeding screw 21, the buffer hopper 22, the stirring paddle 23 arranged in the buffer hopper 22, the horizontal feeding screw 24, and two drive assemblies 4, wherein the two drive assemblies 4 drive the vertical feeding screw 21 and the horizontal feeding screw 24 to operate, respectively. The drive assembly 4 includes the drive motor 41, and the drive shaft 42 drivingly connected to the output shaft of the drive motor 41. The slip roller device 3 includes the servo motor 31, the trapezoidal screw 32 drivingly connected to the servo motor 31, the primary slip roller assembly 33 and the secondary slip roller 34. The primary slip roller assembly 33 includes the support frame 331, and the primary slip roller 332 mounted on the support frame 331. The guide rail 35 is arranged between the servo motor 31 and the secondary slip roller 34, and the support frame 331 is adapted to slide back and forth on the guide rail 35 between the servo motor 31 and the secondary slip roller 34. The support frame 331 is provided with the screw hole 333 drivingly cooperating with the trapezoidal screw 32. The coupling member 43 is arranged between the output shaft of the drive motor 41 and the drive shaft 42 to drivingly connect the output shaft of the drive motor 41 and the drive shaft 42. The coupling member 43 includes the reserved space 431 in which the drive shaft 42 can slide toward the coupling member 43. Each of the horizontal feeding screw 24 and the vertical feeding screw 21 is provided with the transmission member 25, and the transmission member 25 is drivingly and pluggably axially connected to each of the two drive shafts 42 corresponding to the horizontal feeding screw 24 and the vertical feeding screw 25, respectively. The locking assembly 6 is arranged at the connection between the transmission member 25 and the drive shaft 42, and the locking assembly 6 is configured to axially position the transmission member 25 and the drive shaft 42 when the transmission member 25 is drivingly and pluggably axially coupled to the drive shaft 42. In the present embodiment, the transmission member 25 includes the transmission shaft 251, and the claw coupling 252, wherein both ends of the claw coupling 252 are sleeved on the drive shaft 42 and the transmission shaft, respectively.

The locking assembly 6 includes the sleeve assembly, and the sleeve assembly is formed by splicing the first splicing sleeve 61 forming an axial limit and fit with the drive shaft 42 and the second splicing sleeve 62 sleeved on the outside of the transmission member 25. The first splicing sleeve 61 passes through the rack 1 and slides on the rack 1, and the first splicing sleeve 61 and the second splicing sleeve 62 are detachably connected to each other.

The feeding device 2 includes the gearbox 26. The gearbox 26 is provided with two driven shafts 261 and the gear unit 262 drivingly connecting the two driven shafts 261, wherein the two driven shafts 261 are connected to the horizontal feeding screw 24 and the stirring paddle 23, respectively. Two first bushings 27 are arranged between the gearbox 26 and the buffer hopper 22, and the driven shafts 261 pass through the two first bushings 27. The second bushing 28 is arranged between the horizontal feeding screw 24 and the vertical feeding screw 21 and forms a feeding channel between the horizontal feeding screw 24 and the vertical feeding screw 21. Each of the first bushings 27 and the second bushing 28 is comprised of two separable half-pipe bodies.

The first splicing sleeve 61 and the corresponding second splicing sleeve 62 are detachably connected to each other by the clamp 71, and the two half-pipe bodies of each of the first bushings 27 and the second bushing 28 are detachably connected to each other by the clamp 71. The first splicing sleeve 61 and the corresponding second splicing sleeve 62 are provided with the two ring clamping blocks 72, respectively, and the two half-pipe bodies of each of the first bushing 27 and the second bushing 28 are provided with the two ring clamping blocks 72, respectively. The clamp 71 can be simultaneously sleeved on the outsides of the two ring clamping blocks 72 of the first splicing sleeve 61 and the second splicing sleeve 61 to axially position the first splicing sleeve 61 and the second splicing sleeve 61; the clamp 71 can be simultaneously sleeved on the outsides of the two ring clamping blocks 72 of the two half-pipe bodies of each of the first bushings 27 and the second bushing 28 to axially position the two half-pipe bodies of each of the first bushings 27 and the second bushing 28.

The buffer hopper 22 and the gearbox 26 are laterally arranged on one side of the rack 1, and the clamping base 11 is arranged on the upper side of the rack 1. The upper end of the clamping base 11 is provided with the slide groove 111 extending along the arrangement direction of the buffer hopper 22 and the gearbox 26. The L-shaped hanging plate 8 is arranged on the buffer hopper 22 and the gearbox 26, respectively, and the hanging plate 8 can be hung in the slide groove 111 and can slide along the slide groove 111.

The rack 1 is provided with the through hole 12 to facilitate installation of the first splicing sleeve 61. The flange plate 13 is arranged between the through hole 12 and the first splicing sleeve 61 to prevent the first splicing sleeve 61 from extending axially outside of the rack 1. An end of the first splicing sleeve 61 that is inserted on the inside of the rack 1 is provided with the fixing block, and the first splicing sleeve 61 is provided with the operating handle 611, wherein the operating handle 611 is inserted from the outside of the rack 1 to the inside of the rack 1 and connected to the fixing block.

In the embodiment, the rack 1 is further provided with the operation window 9, and the transparent baffle 10 is hingedly connected to the rack 1 at the position corresponding to the operation window 9, and is configured to cover the operation window 9.

The above embodiment is only one of the preferred embodiments of the present invention, and thus ordinary changes and substitutions made by those skilled in the art within the scope of the technical solution of the present invention shall fall within the scope of protection of the present invention.

What is claimed is:

1. A dry granulator, comprising
a rack, a feeding device mounted on the rack, and a slip roller device;
wherein the feeding device comprises a vertical feeding screw, a buffer hopper, a stirring paddle arranged in the buffer hopper, a horizontal feeding screw, a first drive assembly, a second drive assembly, and a gearbox;
wherein the first drive assembly drives the vertical feeding screw to operate and the second drive assembly drives the horizontal feeding screw to operate; each of the first drive assembly and the second drive assembly comprises a drive motor, and a drive shaft drivingly connected to an output shaft of the drive motor;

wherein the gearbox is provided with two driven shafts and a gear unit drivingly connecting the two driven shafts, wherein the two driven shafts are connected to the horizontal feeding screw and the stirring paddle, respectively; two first bushings are arranged between the gearbox and the buffer hopper, and the two driven shafts pass through the two first bushings; a second bushing is arranged between the horizontal feeding screw and the vertical feeding screw to form a feeding channel between the horizontal feeding screw and the vertical feeding screw; each of the two first bushings and the second bushing is comprised of two separable half-pipe bodies;

wherein the slip roller device comprises a servo motor, a trapezoidal screw drivingly connected to the servo motor, a primary slip roller assembly, and a secondary slip roller; the primary slip roller assembly comprises a support frame, and a primary slip roller mounted on the support frame; a guide rail is arranged between the servo motor and the secondary slip roller, and the support frame is adapted to slide back and forth on the guide rail between the servo motor and the secondary slip roller; the support frame is provided with a screw hole drivingly cooperating with the trapezoidal screw;

wherein a coupling member is arranged between the output shaft of the drive motor and the drive shaft to drivingly connect the output shaft of the drive motor and the drive shaft; the coupling member comprises a reserved space to allow the drive shaft to slide toward the coupling member; each of the horizontal feeding screw and the vertical feeding screw is provided with a transmission member, and the transmission member is drivingly and pluggably axially connected to each of the two drive shafts corresponding to the horizontal feeding screw and the vertical feeding screw, respectively; a locking assembly is arranged at a connection between the transmission member and the drive shaft, and the locking assembly is configured to axially position the transmission member and the drive shaft when the transmission member is drivingly and pluggably axially coupled to the drive shaft;

wherein the locking assembly comprises a sleeve assembly, and the sleeve assembly is formed by splicing a first splicing sleeve forming an axial limit and fit with the drive shaft and a second splicing sleeve sleeved on an outside of the transmission member; the first splicing sleeve passes through the rack and slides on the rack, and the first splicing sleeve and the second splicing sleeve are detachably connected to each other; and wherein the first splicing sleeve and the second splicing sleeve are detachably connected to each other by a first clamp, the two separable half-pine bodies of each of the two first bushings and the second bushing are detachably connected to each other by a second clamp; the first splicing sleeve and the second splicing sleeve are provided with two first ring clamping blocks, and the two separable half-pine bodies of each of the two first bushings and the second bushing are provided with two second ring clamping blocks; the first clamp is simultaneously sleeved on outsides of the two first ring clamping blocks of the first splicing sleeve and the second splicing sleeve to axially position the first splicing sleeve and the second splicing sleeve; the second clamp is simultaneously sleeved on outsides of the two second ring clamping blocks of the two separable half-pipe bodies of each of the two first bushings and the second bushing to axially position the two separable half-pipe bodies of each of the two first bushings and the second bushing.

2. A dry granulator, comprising:

a rack, a feeding device mounted on the rack, and a slip roller device;

wherein the feeding device comprises a vertical feeding screw, a buffer hopper, a stirring paddle arranged in the buffer hopper, a horizontal feeding screw, a first drive assembly, a second drive assembly, and a gearbox;

wherein the first drive assembly drives the vertical feeding screw to operate and the second drive assembly drives the horizontal feeding screw to operate; each of the first drive assembly and the second drive assembly comprises a drive motor, and a drive shaft drivingly connected to an output shaft of the drive motor;

wherein the gearbox is provided with two driven shafts and a gear unit drivingly connecting the two driven shafts, wherein the two driven shafts are connected to the horizontal feeding screw and the stirring paddle, respectively; two first bushings are arranged between the gearbox and the buffer hopper, and the two driven shafts pass through the two first bushings; a second bushing is arranged between the horizontal feeding screw and the vertical feeding screw to form a feeding channel between the horizontal feeding screw and the vertical feeding screw; each of the two first bushings and the second bushing is comprised of two separable half-pipe bodies;

wherein the slip roller device comprises a servo motor, a trapezoidal screw drivingly connected to the servo motor, a primary slip roller assembly and a secondary slip roller; the primary slip roller assembly comprises a support frame, and a primary slip roller mounted on the support frame; a guide rail is arranged between the servo motor and the secondary slip roller, and the support frame is adapted to slide back and forth on the guide rail between the servo motor and the secondary slip roller; the support frame is provided with a screw hole drivingly cooperating with the trapezoidal screw;

wherein a coupling member is arranged between the output shaft of the drive motor and the drive shaft to drivingly connect the output shaft of the drive motor and the drive shaft; the coupling member comprises a reserved space to allow the drive shaft to slide toward the coupling member; each of the horizontal feeding screw and the vertical feeding screw is provided with a transmission member, and the transmission member is drivingly and pluggably axially connected to each of the two drive shafts corresponding to the horizontal feeding screw and the vertical feeding screw, respectively; a locking assembly is arranged at a connection between the transmission member and the drive shaft, and the locking assembly is configured to axially position the transmission member and the drive shaft when the transmission member is drivingly and pluggably axially coupled to the drive shaft;

wherein the locking assembly comprises a sleeve assembly, and the sleeve assembly is formed by splicing a first splicing sleeve forming an axial limit and fit with the drive shaft and a second splicing sleeve sleeved on an outside of the transmission member; the first splicing sleeve passes through the rack and slides on the rack, and the first splicing sleeve and the second splicing sleeve are detachably connected to each other; and wherein the buffer hopper and the gearbox are laterally arranged on an upper side of the rack, and a clamping base is arranged on the upper side of the rack; an upper end of the clamping base is provided with a slide groove extending along an arrangement direction of the buffer hopper and the gearbox; an L-shaped hanging plate is arranged on the buffer hopper and the gearbox, respectively, and the L-shaped hanging plate is hung in the slide groove and slides along the slide groove.

3. A dry granulator, comprising:

a rack, a feeding device mounted on the rack, and a slip roller device;

wherein the feeding device comprises a vertical feeding screw, a buffer hopper, a stirring paddle arranged in the buffer hopper, a horizontal feeding screw, a first drive assembly, and a second drive assembly;

wherein the first drive assembly drives the vertical feeding screw to operate and the second drive assembly drives the horizontal feeding screw to operate; each of the first drive assembly and the second drive assembly comprises a drive motor, and a drive shaft drivingly connected to an output shaft of the drive motor;

wherein the slip roller device comprises a servo motor, a trapezoidal screw drivingly connected to the servo motor, a primary slip roller assembly, and a secondary slip roller; the primary slip roller assembly comprises a support frame, and a primary slip roller mounted on the support frame; a guide rail is arranged between the servo motor and the secondary slip roller, and the support frame is adapted to slide back and forth on the guide rail between the servo motor and the secondary slip roller; the support frame is provided with a screw hole drivingly cooperating with the trapezoidal screw;

wherein a coupling member is arranged between the output shaft of the drive motor and the drive shaft to drivingly connect the output shaft of the drive motor and the drive shaft; the coupling member comprises a reserved space to allow the drive shaft to slide toward the coupling member; each of the horizontal feeding screw and the vertical feeding screw is provided with a transmission member, and the transmission member is drivingly and pluggably axially connected to each of the two drive shafts corresponding to the horizontal feeding screw and the vertical feeding screw, respectively; a locking assembly is arranged at a connection between the transmission member and the drive shaft, and the locking assembly is configured to axially position the transmission member and the drive shaft when the transmission member is drivingly and pluggably axially coupled to the drive shaft;

wherein the locking assembly comprises a sleeve assembly, and the sleeve assembly is formed by splicing a first splicing sleeve forming an axial limit and fit with the drive shaft and a second splicing sleeve sleeved on an outside of the transmission member; the first splicing sleeve passes through the rack and slides on the rack, and the first splicing sleeve and the second splicing sleeve are detachably connected to each other; and wherein the rack is provided with a through hole; the first splicing sleeve is mounted in the through hole; a flange plate is arranged between the through hole and the first splicing sleeve to prevent the first splicing sleeve from extending axially to an outside of the rack; an end of the first splicing sleeve is inserted on an inside of the rack and the end of the first splicing sleeve is provided with a fixing block, and the first splicing sleeve is provided with an operating handle, wherein the operating handle is inserted from the outside of the rack to the inside of the rack and the operating handle is connected to the fixing block.

4. The dry granulator according to claim 1, wherein, the buffer hopper and the gearbox are laterally arranged on an upper side of the rack, and a clamping base is arranged on the upper side of the rack; an upper end of the clamping base is provided with a slide groove extending along an arrangement direction of the buffer hopper and the gearbox; an L-shaped hanging plate is arranged on the buffer hopper and the gearbox, respectively, and the L-shaped hanging plate is hung in the slide groove and slides along the slide groove.

5. The dry granulator according to claim 1, wherein, the buffer hopper and the gearbox are laterally arranged on an upper side of the rack, and a clamping base is arranged on the upper side of the rack; an upper end of the clamping base is provided with a slide groove extending along an arrangement direction of the buffer hopper and the gearbox; an L-shaped hanging plate is arranged on the buffer hopper and the gearbox, respectively, and the L-shaped hanging plate is hung in the slide groove and slides along the slide groove.

6. The dry granulator according to claim 1, wherein, the rack is provided with a through hole; the first splicing sleeve is mounted in the through hole; a flange plate is arranged between the through hole and the first splicing sleeve to prevent the first splicing sleeve from extending axially to an outside of the rack; an end of the first splicing sleeve is inserted on an inside of the rack and the end of the first splicing sleeve is provided with a fixing block, and the first splicing sleeve is provided with an operating handle, wherein the operating handle is inserted from the outside of the rack to the inside of the rack and the operating handle is connected to the fixing block.

7. The dry granulator according to claim 1, wherein, the rack is provided with a through hole; the first splicing sleeve is mounted in the through hole; a flange plate is arranged between the through hole and the first splicing sleeve to prevent the first splicing sleeve from extending axially to an outside of the rack; an end of the first splicing sleeve is inserted on an inside of the rack and the end of the first splicing sleeve is provided with a fixing block, and the first splicing sleeve is provided with an operating handle, wherein the operating handle is inserted from the outside of the rack to the inside of the rack and the operating handle is connected to the fixing block.

* * * * *